US007009980B1

(12) United States Patent
Cao

(10) Patent No.: US 7,009,980 B1
(45) Date of Patent: *Mar. 7, 2006

(54) APPARATUS AND METHOD FOR AUTOMATIC PORT IDENTITY DISCOVERY IN HIERARCHICAL HETEROGENOUS SYSTEMS

(75) Inventor: Yang Cao, Bradford, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,615

(22) Filed: Mar. 13, 2000

(51) Int. Cl.
*H04L 12/66* (2006.01)

(52) U.S. Cl. .................. 370/395.54; 370/356; 370/216

(58) Field of Classification Search ............... 370/437, 370/449–450, 395.54, 351–356, 217, 218, 370/219, 220, 225, 227, 228, 438, 439, 498, 370/522, 524, 395.2, 401, 410; 398/58; 714/1, 714/2; 340/825.01, 2.1, 2.23
See application file for complete search history.

(56) References Cited

U.S. PATENT DOCUMENTS

| | | | | |
|---|---|---|---|---|
| 5,544,163 A | * | 8/1996 | Madonna | 370/352 |
| 5,805,578 A | | 9/1998 | Stirpe et al. | |
| 5,870,382 A | * | 2/1999 | Tounai et al. | 370/220 |
| 5,923,643 A | * | 7/1999 | Higgins et al. | 370/218 |
| 6,094,682 A | | 7/2000 | Nagasawa | |
| 6,404,734 B1 | * | 6/2002 | Stamatelakis et al. | 370/227 |
| 6,473,397 B1 | * | 10/2002 | Au | 370/223 |
| 6,549,513 B1 | * | 4/2003 | Chao et al. | 370/227 |
| 6,594,044 B1 | * | 7/2003 | Buchanan et al. | 398/58 |
| 6,654,802 B1 | * | 11/2003 | Oliva et al. | 709/224 |
| 6,735,215 B1 | * | 5/2004 | Cao | 370/437 |

FOREIGN PATENT DOCUMENTS

| | | |
|---|---|---|
| EP | 0 721 275 | 7/1996 |
| JP | 11261512 | 9/1999 |

OTHER PUBLICATIONS

Y. Yasuda et al., "Automated Network Connection Tracing and Data Gathering Methods in the SDH Network," IEEE Transactions on Communications, IEEE Inc., New York, vol. 42, No. 2/3/4, Feb. 1, 1994, pp. 1065-1075.
R. Ramaswami, et al., "Distributed Network Control for Wavelength Routed Optical Networks," Proceedings of IEEE Infocom 1996, Conference on Computer Communications, Fifteenth Annual Joint Conference of the IEEE Computer and Communications Societies, Networking the Next Generation, San Francisco, CA, Mar. 24-28, 1996, Proceedings of Infocom, vol. 2, Conf. 15, Mar. 24, 1996, pp. 138-147, XP010158064.

\* cited by examiner

*Primary Examiner*—Steven Nguyen

(57) ABSTRACT

A heterogeneous telecommunications system employs "out of band" signalling to automatically discover the identity of the two ports connecting two network elements through a specific link. Either of the connected network elements may be a circuit switching network element or a packet switching network element. One network element initiates the port discovery process and transmits an overhead signal, such as a SONET/SDH protection switching message, to the network element attached at the other end of the link. The other network element monitors the status of its ports and, when it detects a change in state at one of the ports, resulting from the first network element's transmissions, the receiving, or passive, network element recognizes the port as the port which forms a part of the link of interest. Each group of network elements, packet switching and circuit switching, elects a network element leader which coordinates requests for port identification.

26 Claims, 8 Drawing Sheets

| BYTE K2 BITS 6, 7, 8 (CHANNEL STATUS) DEFINITION 12 |
|---|
| 111 = AIS-L |
| 110 = RDI-L |
| 101 = NOT USED |
| 100 = NOT USED |
| 011 = ET (EXTRA TRAFFIC ON PROTECTION CHANNEL) |
| 010 = BRIDGED AND SWITCHED |
| 001 = BRIDGED |
| 000 = IDLE |

FIG. 2

APPARATUS AND METHOD FOR AUTOMATIC PORT IDENTITY DISCOVERY IN HIERARCHICAL HETEROGENOUS SYSTEMS

FIELD OF THE INVENTION

The invention relates to the determination of port identities in a telecommunications system and, in particular to the automatic determination of port identities in a heterogenous telecommunications system.

BACKGROUND OF THE INVENTION

In 1876, inside a third floor walk-up garret apartment in the Scollay Square section of Boston Mass., Alexander Graham Bell spoke the first sentence transmitted over telephone wires. Technical innovations have dramatically transformed the telecommunications industry over the past one hundred and twenty three years. For example, telecommunications switching systems have evolved considerably from "hand operated" systems in which one instrument was electrically connected (through a hierarchical switching network) to another through the intervention of a human operator who would physically plug one circuit into another. Such direct electrical connection of two or more channels between two points (at least one channel in each direction), a connection that provides a user with exclusive use of the channels to exchange information, is referred to as circuit switching, or line switching. Human operators have largely been replaced by systems which employ electronic switching systems (ESS), in which the instruments are automatically connected through the network by electronic systems.

Additionally, in many cases, the signalling system employs optical signalling instead of, or in addition to, electronic signalling. Nevertheless, such switching systems often still employ circuit switching, a technique which yields highly reliable service, particularly for such "real time" communications applications as voice, in which the momentary loss of a channel is annoying and repeated such losses are unacceptable. Switching systems may interconnect telephone instruments through circuit switching, employing time division multiplexing (TDM), for example. The switching system may carry digitized telecommunications signal over optical paths that are in conformity with synchronous optical network (SONET) standards. Such networks include network elements such as SONET network elements, SDH network elements, or wavelength division multiplexed network elements, for example. Circuit switching network elements include any network elements which conform with SONET/SDH signal formats. The signal formats are described, for example, in a Technical Advisory entitled "Synchronous Optical Network (SONET) Transport Systems: Common Generic Criteria," TA-NWT-000253, Bell Communications Research, Issue 6, September 1990, which is hereby incorporated by reference. For a variety of reasons it may be important to know which port in a given network element (NE) within such a system is connected to a particular port of another NE within the system.

Although SONET systems may incorporate a facility for such port identification and network elements within a circuit switching telecommunications system may employ this facility to identify ports, network elements within a packet switching system do not typically provide for port identification. That is, a technique known as packet switching may be employed for the transmission of data over telecommunications network. With packet switching data is transmitted in packets, and the communications channel is only occupied for the duration of a packet's transmission. After the transmission, the channel is available for use by other packets being transferred for other users. The packetized transmission may be transmitted using asynchronous transfer mode (ATM) techniques, for example. Asynchronous transfer mode (ATM) is a connection-oriented transmission technique that employs fixed-size blocks of data, called cells, each of which consists of a five octet long header and an information field that is forty-eight octets long. Packet switching network elements, such as ATM nodes or Internet Protocol (IP) routers, typically ignore the SONET signalling that might otherwise be employed to identify specific interconnected ports within a telecommunications network. Consequently, operator intervention may be required to accomplish such identification. Such a process would be time consuming, fraught with the potential for errors, and cost-prohibitive. Systems that employ both circuit switching and packet switching network elements and which employ SONET signalling may be referred to hereinafter as heterogeneous telecommunications systems. A heterogeneous telecommunications system that provides for automatic port identification would therefore be highly desirable.

SUMMARY

A heterogeneous telecommunications system in accordance with the principles of the present invention employs "out of band" signalling to automatically discover the identities of ports interconnected between network elements within a system that includes a plurality of circuit switching elements and packet switching elements. Interconnected circuit switching and packet switching network elements employ a network management channel, such as a local area network (LAN) network management link, to automatically discover port binding information (that is, which port of an initiating network element is connected to which port of a receiving network element).

In accordance with the principles of the present invention each group of network elements, that is a group of circuit switched network elements and a group of packets switched network elements, determines a "leader". The leaders from each network element group interact automatically determine port binding information, that is, to determine which port of one network element connects to which port of another network element. When a network leader receives a port recognition request from one of its associated network elements, that is, when the circuit switching network element leader receives a port recognition request from one of the circuit switching network elements, or the packet switching network element leader receives a request from a packet switching network element the leader places the request in a queue. When the queued request reaches the top of the queue, for example, with a FIFO queue, when all preceding requests have been serviced, the network element leader sends a recognition request message to the network element leader of the other group element. The recognition request is transmitted through an "out of band channel", such as a network management link, which may take the form of a LAN, for example.

The initiating network element awaits an acknowledgement signal from the receiving network element leader, through the out of band channel, and, once received, transmits a test message from a specific port to the receiving network element. The test message transmitted by the initiating network element may be a SONET/SDH "K2 byte"

protection message. After sending the acknowledgement message to the initiating network element, the receiving network elements begin polling their ports to detect which port receives the test message. Once the receiving network element detects which of its ports receives the test message, the receiving network element records the port binding information and stops polling its own ports. Additionally, the receiving network element transmits a detection message to the receiving network element leader, which includes the receiving network element's port identity, through the out of band channel. The receiving network element leader passes this information to the initiating network element leader through the out of band channel. Upon receiving the detection message from the receiving network element leader, the initiating network element leader passes the information to the initiating network element. The initiating network element thereupon stops sending the test message through the SONET/SDH link, records the port binding information, and transmits a recognition acknowledgement message to the receiving network element through the out of band channel and network element leaders.

BRIEF DESCRIPTION OF THE DRAWINGS

The above and further features, aspects, and advantages of the invention will be apparent to those skilled in the art from the following detailed description, taken together with the accompanying drawings in which:

FIG. 2 is a table that illustrates SONET/SDH channel status bit definitions;

DETAILED DESCRIPTION

Although a network element may be referred to herein as a SONET/SDH network element, and or as an ATM network element, it is assumed that both types of network element employ SONET/SDH at the transport level. Additionally, it is assumed that the circuit switching network element executes the byte processing that might prove onerous to a packet switching network element, such as an ATM network element. The term "SONET/SDH" network element is used interchangeably with the term "circuit switched network element", and the term "ATM network element" is used interchangeably with the term "packet switched network element", herein.

Figure 1:
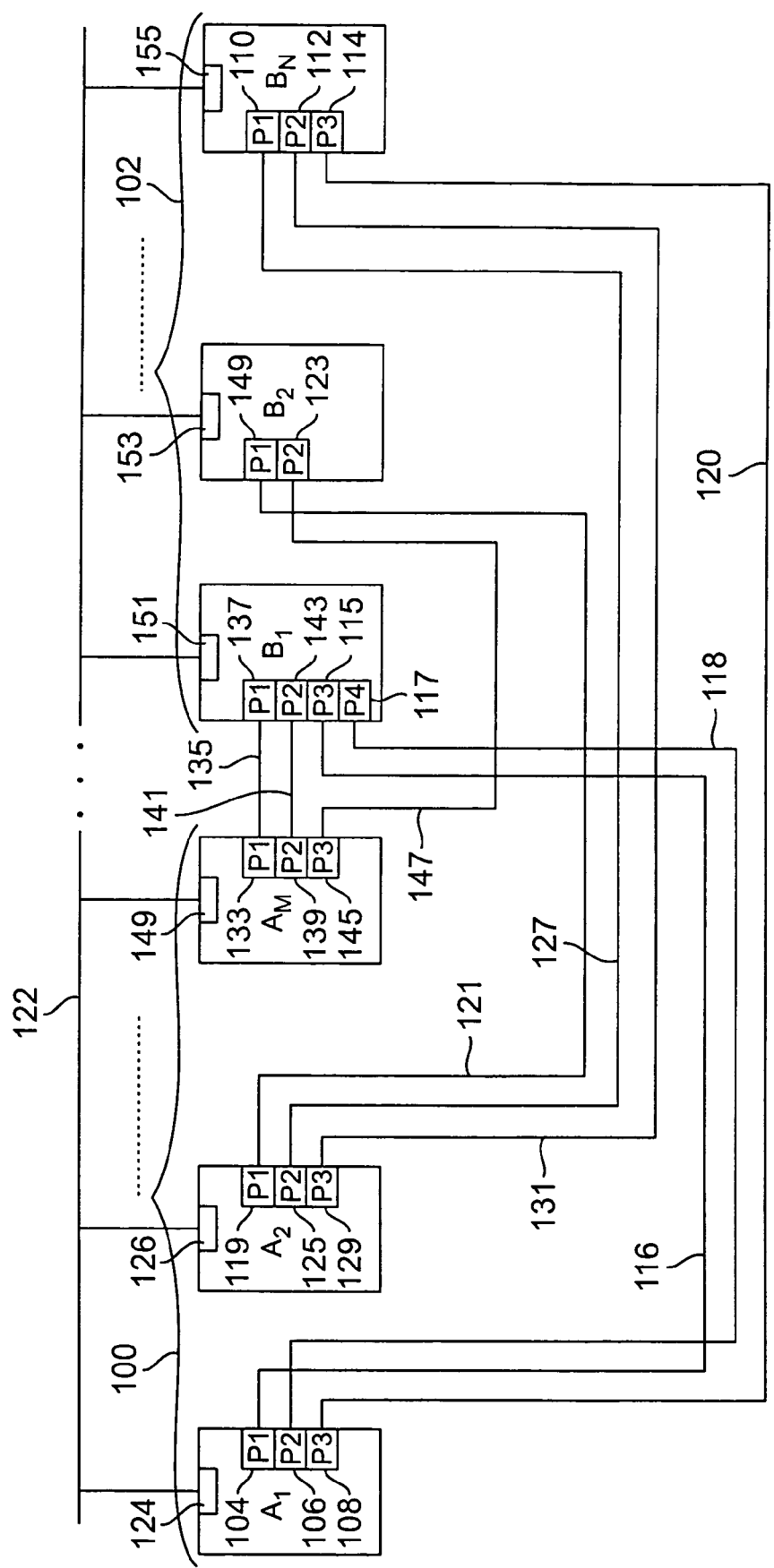
FIG. 1 is a conceptual block diagram of a multi-network-element heterogeneous telecommunications system in accordance with the principles of the present invention.

As illustrated in the conceptual block diagram of FIG. 1, a heterogeneous telecommunications system in accordance with the principles of the present invention includes a plurality of circuit switching network elements 100 (A1, A2, and A3) and a plurality of packet switching network elements 102 (B1, B2, and B3). Each of the network elements is connected to other network elements through ports, such as port 104 (P1), port 106 (P2), and port 108 (P3) of the circuit switching network element A1 and port 110 (P1), port 112 (P2), and port 14 (P3) of the packet switching network element B1.

In the illustrative conceptual block diagram of FIG. 1, port P1 104 of NE A1 is connected through a link 116 to port P3 115 of NE B1, port P2 106 of NE A1 is connected through a link 118 to port P4 117 of NE B1, and port P3 108 of NE A1 is connected through a link 120 to port P3 114 of NE BN. Similarly, port P1 119 of NE A2 is connected through a link 121 to port P2 123 of NE B2, port P2 125 of NE A2 is connected through a link 127 to port P1 110 of NE BN, port P3 129 of NE A2 is connected through a link 131 to port P2 112 of NE BN. Finally, port P1 133 of NE AM is connected through a link 135 to port P1 137 of NE B1, port P2 139 of NE AM is connected through a link 141 to port P2 143 of NE B1, and port P3 145 of NE AM is connected through a link 147 to port P1 149 of NE B2. Each of the links 116, 118, 120, 121, 127, 131, and 147 employs a SONET/SDH transport level and in addition to the data they carry, overhead, control, information is sent through the links.

Although it may be possible to use the control information carried in these links to determine the port interconnectivity of the network elements A1, A2, AM and B1, B2, and BN, packet switching devices, such as the network element B1, would have to get involved in "byte processing" to take advantage of this overhead information. This additional byte processing burden would prove prohibitive, or, at the least, inconvenient for packet switching NEs. Nevertheless, this port interconnectivity information is required for some applications and manual discovery and recordation of this interconnectivity information also has significant drawbacks. In accordance with the principles of the present invention, an "out of band" communications channel, such as that formed by the link 122 and interfaces 124, 126, 149, 151, 153, and 155 respectively located within NEs A1, A2, AM, B1, B2, and BN. This out of band channel may take the form of a local area network (LAN) which connects a group of NEs and which provides a path for management and control of the NEs thus connected. In accordance with the principles of the present invention, the NEs support STS-1 line overhead K1 and K2 byte protection switching, which is discussed in, Ming-Chwan Chow, Undersanding SONET/SDH Standards and Applications, Andan Publisher, N.J., 1995 pgs 2–25 through 2–28 and 7–39 through 740, which is hereby incorporated by reference. More particularly, the NEs support the standard, at the least insofar as the K1/K2 byte definitions (only definitions for bits 6, 7 and 8 are illustrated) as set forth in the table of FIG. 2.

In accordance with the principles of the present invention, K1 and K2 bytes, which are employed by both circuit switching and packet switching network elements for protection switching, are employed as a recognition signal whereby port identities may be automatically discovered using an automatic interconnection recognition protocol (AIRP). As indicated in the table of FIG. 2 bit codes 101 and 100 are not previously assigned. Code 100 is used in accordance with the principles of the present invention as the AIRP SONET/SDH recognition signal. The new protocol (AIRP) may use either a LAN connection or serial link that employs TCP as a transport layer for communications sessions. Port interconnectivity may be discovered between two peers with a single AIRP session and, in order to establish and maintain the port interconnectivity information, an AIRP session should be run each time an NE is initialized or re-booted. As will be described in greater detail below, an NE may initiate the port interconnectivity discovery process by sending a port identification initiation message to a NE to which it is linked.

In accordance with the principles of the present invention, an NE may, under various circumstances, such as it's initialization, or re-booting, initiate a port interconnectivity discovery process by sending a recognition request message to a NE to which it is bound through a network link. The message first passes through the initiating NE's group leader. That is, in accordance with the principles of the present invention, each group of network elements 100 and 102 elects a leader that coordinates the port identification process. The leader associated with the initiating NE queues port recognition requests from its NEs and, forwards the recognition requests from the initiating network element, such as network element A1 to a receiving network element, such as network element B1 through the out of band link 122. The initiating network element leader, NE A1 for example, awaits an acknowledgement signal from the receiving network element B1 and, once received, passes the acknowledgement signal to the initiating NE which then transmits a test message from a specific port, such as port P1 104 to the receiving network element B1. The test message transmitted by, the initiating network element may be a SONET/SDH "K2 byte" protection message.

After sending an acknowledgement message to the initiating network element through the link 122, the receiving network element leader alerts the receiving NE, NE B1, for example, which begins polling its ports to detect which port receives the test message. Once the receiving network element detects which of its ports receives the test message (port P3 115 in this illustrative example), the receiving network element records the port binding information and stops polling its own ports. Additionally, the receiving network element B1 transmits a detection message to the initiating network element A1. This detection message includes the receiving network element's port identity and is transmitted, by the receiving. NE leader, for example, through the out of band channel, link, 122. Upon receiving the detection message from the receiving network element B1, the initiating network element A1 stops sending the test message through the SONET/SDH link 118, records the port binding information, and transmits a recognition acknowledgement message to the receiving network element B1 through the out of band channel 122.

After initialization, each NE plays either a leader role or non-leader role. Each non-leader packet switching NE (ATM NE in the following examples) sets up a TCP connection with an ATM virtual leader. NE leaders, or virtual leaders, are "elected" as described below. An ATM virtual leader node sets up TCP connections with all the non-leader ATM NEs on the same out of band channel (referred to as a LAN below). Similarly, each non-leader packet switching NE (SONET NE in the following examples), sets up a TCP connection with a SONET virtual leader node and the SONET virtual leader node sets up TCP connections with all the non-leader SONET NEs on a LAN. Given M ATM NEs and N SONET NEs, the total number of TCP connections needed is $2*(M+N-2)$. (If, instead, a point-to-point based connection is employed, $M^2+N^2-M-N$ connections would be required). Should a non-leader NE fail, either through failure of the NE itself or through a failure of the NE's LAN connection, the NE leader notifies a network management system (not shown) of the failure. If a leader NE fails, through failure of the NE or its connection to the LAN, the leader election process will be repeated and the newly elected leader will notify the network management system of the previous NE's failure.

After initialization, two end systems, that is, between two NEs, one from a circuit switching side and one from a packet switching side, that use an automatic interconnection recognition protocol (AIRP) in accordance with the principles of the present invention to exchange inter-connection recognition information will be referred to as "AIRP Peers". The communication mechanism for AIRP is based on a LAN connection and employs TCP as a reliable transport layer for sessions. Between two multi-link connected AIRP peers, only one AIRP session is required. AIRP session should be established each time NE system is initialized or re-booted. In the illustrative embodiment of FIG. 1 and in the discussions to follow M ATM NEs (packet switching NEs, in general) are connected through an operational LAN, and N SONET Nes (circuit switching NEs In general) are connected through another operation LAN. A router (not shown) is used to inter-connect these two sub-networks. Each LAN has its pre-configured multi-cast address. Any ATM NE can use a SONET NE LAN multi-cast address to reach any SONET NE and any SONET NE may use an ATM NE LAN multi-cast address to reach any ATM NE. Each port of each ATM NE is identified through Switch Name, Slot No. and Port ID and each port of each SONET NE is identified through TID and AID (Port No. and NADDR).

The AIRP includes seven operational messages:
1. AIRP_Recognition_Request message, used to request the corresponding side to participate in inter-connection recognition process.
2. AIRP_Recognition_Notification message, used by SONET virtual leader to notify each SONET NE to start polling process.
3. AIRP_Recognition_Grant message, used by ATM virtual leader to grant certain ATM NE's link recognition request.
4. AIRP_Recognition_Response message, used to respond to the requesting side.
5. AIRP_Recognition_Detected message, used to inform the requesting side the corresponding inter-connection ID information
6. AIRP_Ack message, used by requesting side as a positive acknowledgement message back to the requested side.
7. AIRP_Nak message, used by requested side to indicate certain negative acknowledgement scenario.

Figure 3:
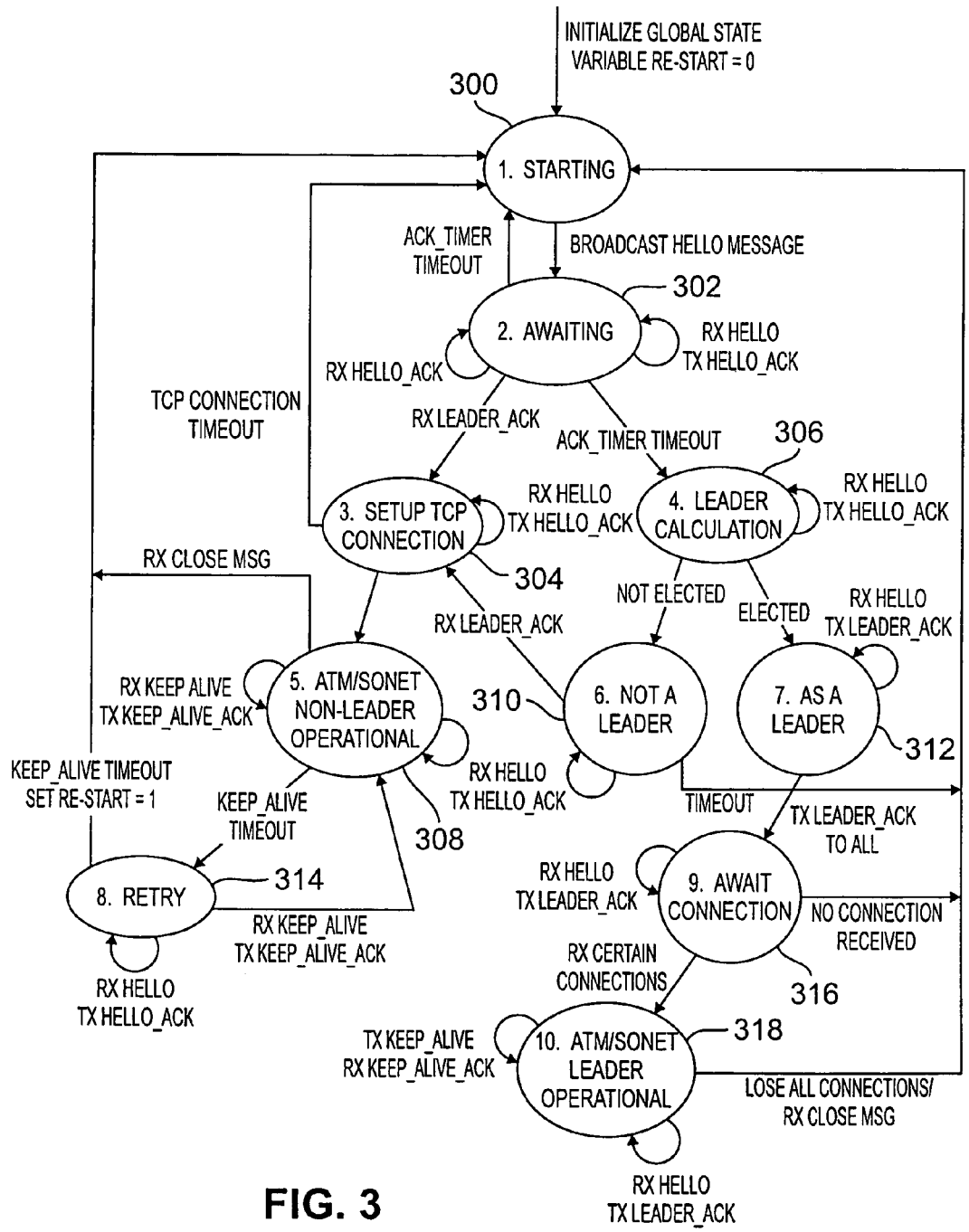
FIG. 3 is a state diagram that illustrates the initialization of NEs in accordance with the principles of the present invention.

The state diagram of FIG. 3 illustrates the various states an NE may assume and transitions between those states at the time of initialization. The process begins in step 300, the starting state, in which an NE sends an AIRP_Hello message and starts an acknowledgement timer (ACK_timer). If the NE is an ATM NE, it is equipped with an ATM group MAC address. If the NE is a SONET NE, it is equipped with a SONET group MAC address. At system initialization, the global variable "restart" is initialzied to 0. From the starting state the process proceeds to step 302, the awaiting state. If the NE receives AIRP_Leader_Ack before the ACK_timer expires, the NE stops the timer and transit to Step 304, the TCP setup state. If the NE receives any AIRP_Hello message, it will return an AIRP_Hello_Ack message. If the NE receives an AIRP_Hello_Ack from other NEs, it will store the information contained in the AIRP_Hello_Ack messages. If the Ack_timer times out before the NE receives an AIRP_Hello_Ack, the NE stops the timer returns to step 300, the starting state. If the Ack_timer times out for want of an acknowledgment message from the leader, but the NE receives multiple AIRP_Hello_Ack messages from other NEs, the NE stops the timer and proceeds to step 306, the leader calculation state. A timeout or the reception of any message other than an AIRP_Hello_Ack message returns the NE to the starting state 300.

In the TCP setup state 304, the NE sets up a TCP connection with an NE identified as an NE leader. The NE also resets the state variable re-start=0, and proceeds to step 308, the non-leader operational state. If the NE can't successfully establish TCP connection with the leader (connection time-out), the NE returns to step 300, the starting state. If the NE receives an AIRP_Hello message, it returns an AIRP_Hello_Ack message.

In the leader calculation state 306, the NE sorts all the MAC address including those received from the other NEs' AIRP_Hello_Ack_messages and its own MAC address and "elects" a leader based on the addresses. For example the NE having the highest address may be used as the leader and, if the NE itself has the maximum MAC address, it is assumed elected and proceeds to step 312 where it operates as a leader. Otherwise, the NE proceeds to step 310 where it operates as a non-leader. If the NE receives an AIRP_Hello message, it returns an AIRP_Hello_Ack message.

Figure 5:
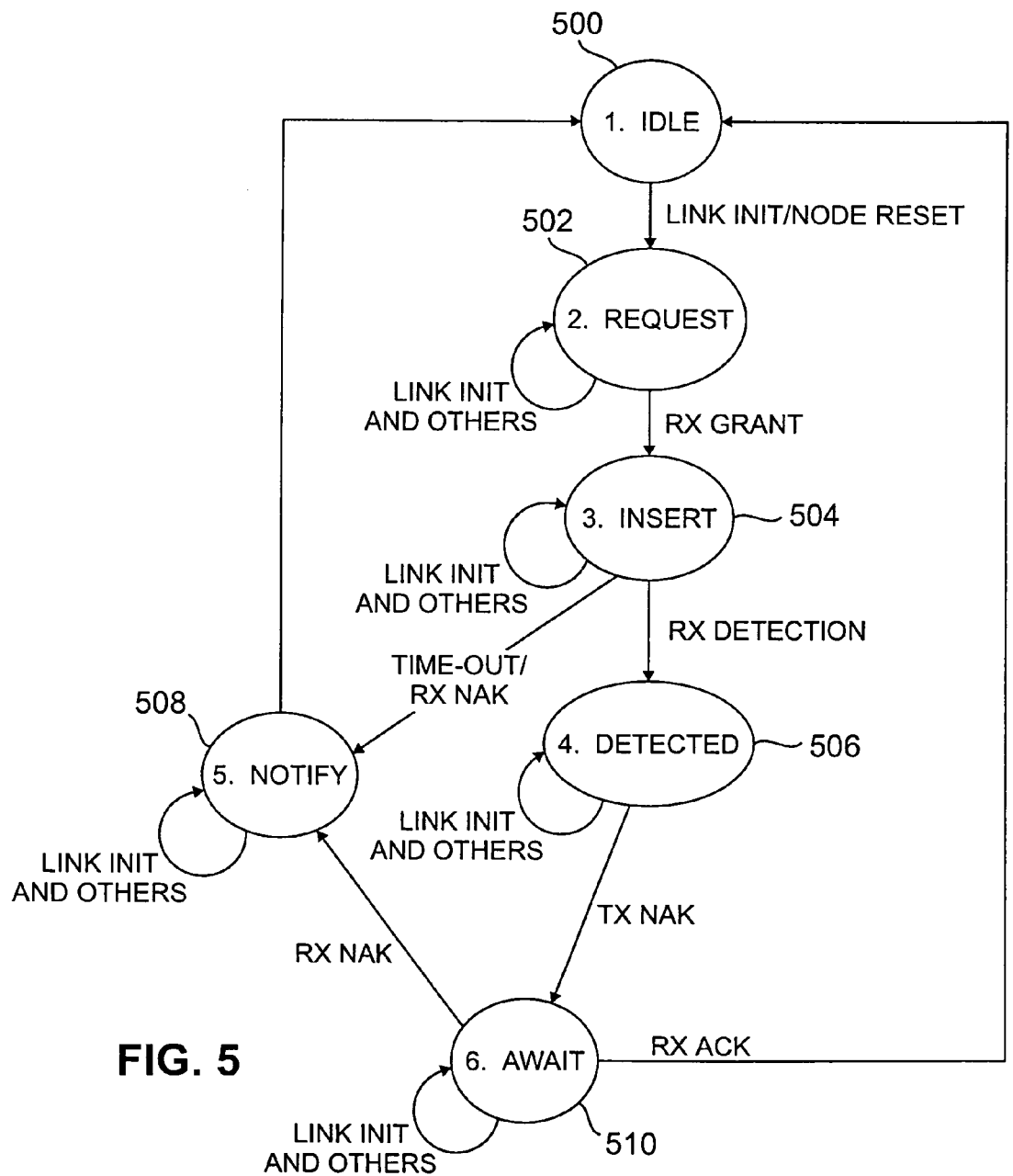
FIG. 5 is a state diagram that illustrates the operation of a requesting non-leader NE in accordance with the principles of the present invention.
Figure 7:
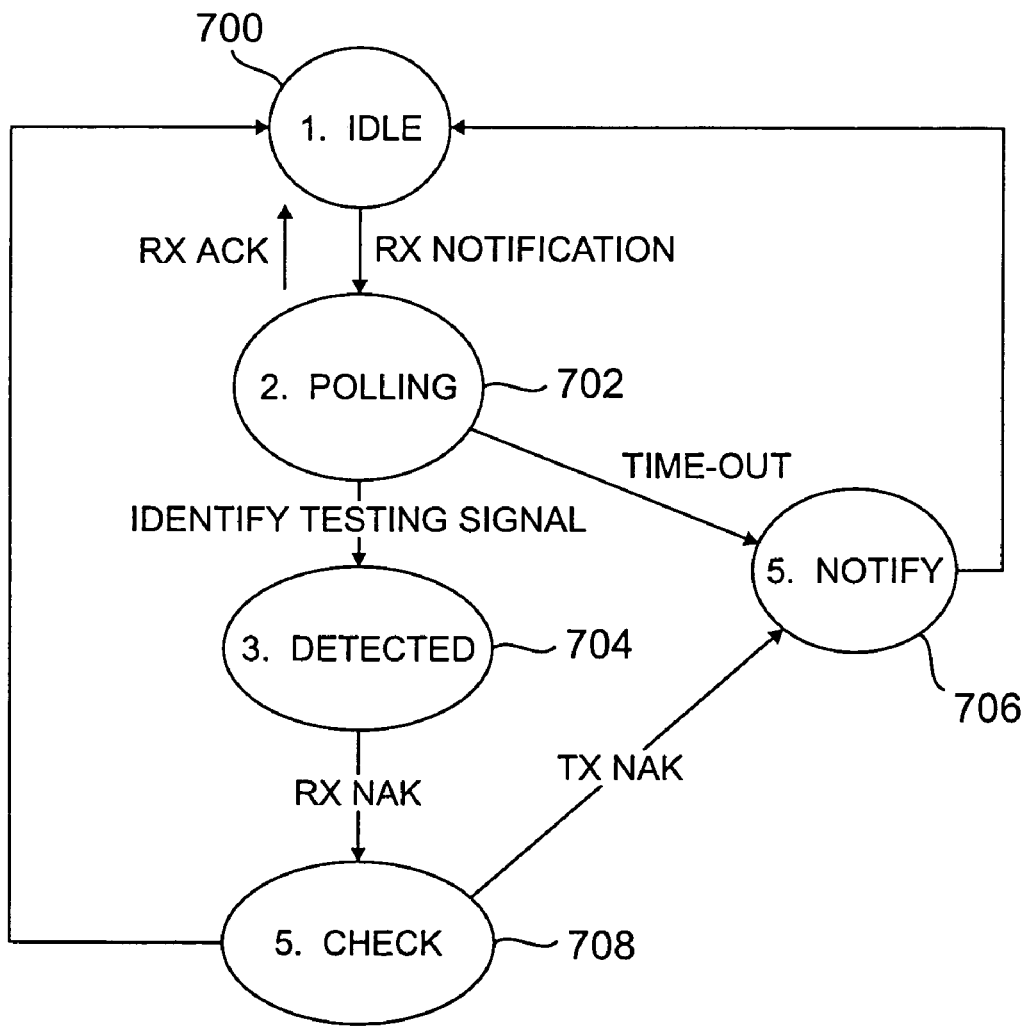
FIG. 7 is a state diagram that illustrates the operation of a non-requesting non-leader NE in accordance with the principles of the present invention.

In step 308, the non-leader state, a SONET or ATM NE will operate in a non-leader mode as described in greater detail in the discussion related to FIGS. 7 and 5, respectively. If an NE receives an AIRP_Hello message, it returns an AIRP_Hello_Ack message. If an Ne receives an AIRP__Close message the NE returns an AIRP_Ack message and returns to step 300, the starting state. If an NE receives an AIRP_Keep_Alive message from the leader before the timer expires the NE returns an AIRP_Keep_Alive_Ack message to the leader. If an NE does not receive an AIRP_Keep_Alive message from the leader within the timer period, the NE re-starts its Keep_alive timer and proceeds to step 314, the retry state. All other operational messages will keep the NE in step 308, the operational state. The operational state is described in greater detail below.

In step 310, the "not-a-leader" state, an NE awaits the reception of an AIRP_Leader_Ack message and, if it receives such as message within the period of its acknowledgement timer, the NE records its leader NE's information and proceeds to step 304, the setup TCP state. In step 310, a not a leader state, the NE records a leaders information and proceeds to step 304 if it receives an AIRP_Leader_Ack message within the timer period. If the NE does not receive an AIRP_Leader_Ack message within the timer period, the NE proceeds to step 300, the starting state. If the NE receives an AIRP_Hello message, the NE returns an AIRP_Hello_ack message.

In step 312, the leader state, an NE, which is a virtual leader node, sends an AIRP_Leader_Ack message to all the Nes that have sent a Hello message to the leader node. If the value of the NE's state variable re-start is 1, the NE notifies the network management system of the loss of the previous leader node. Additionally, the NE resets the re-start state variable to o and proceeds to step 316, a state in which the NE awaits connection. If the NE receives an AIRP_Hello message, it returns an AIRP_Leader_Ack message.

In step 314, the Retry state, an NE returns an AIRP_Keep_Alive_Ack message to the leader if the NE receives an AIRP_Keep_Alive message within the timer period. If the keep alive timer times out, the NE sets the re-start state variable to 1 and proceeds to step 300, the starting state. If the NE receives an AIRP_Hello message, it will returns an AIRP_Hello_ack message. In step 316, the await connection state, an NE that has been elected virtual leader proceeds to step 318 if it receives TCP connection requests and has set up TCP connections with other NEs. If the leader NE does not receive a TCP connection request during the timer period, the leader NE assumes it lost the LAN connection or some other failure has occurred with the LAN and the NE will proceed to step 300, the starting step. If the NE cannot establish TCP connection with a particular node, the leader NE will drop that node from its waiting list. In such an event, the node dropped from the waiting list will re-broadcast an AIRP_Hello message. If the leader NE receives an AIRP_Hello message, it will return an AIRP_Leader_Ack message.

Figure 6:
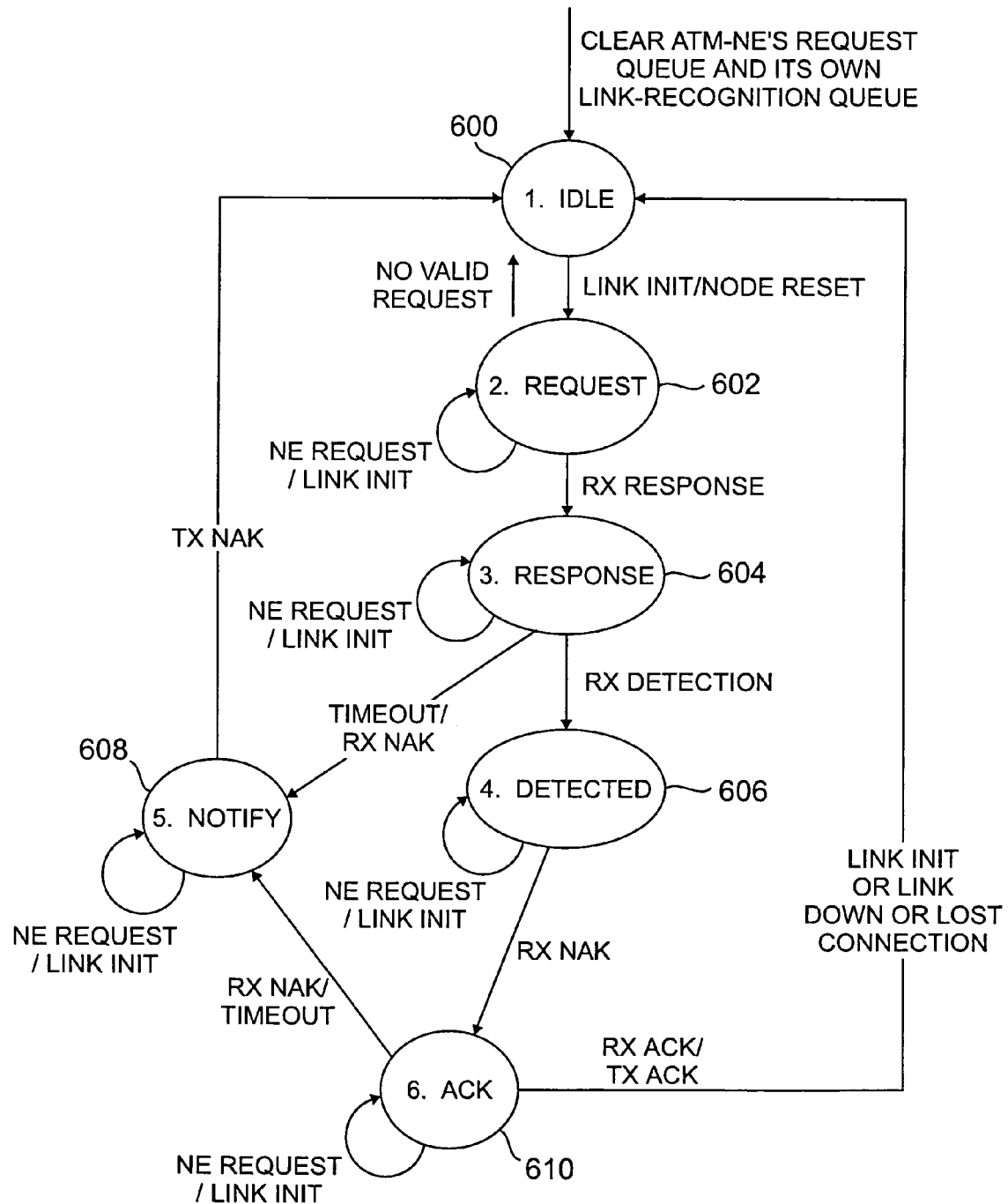
FIG. 6 is a state diagram that illustrates the operation of a requesting virtual leader NE in accordance with the principles of the present invention

In step 318, the leader operational state, an ATM node will run in an ATM virtual-leader operational state, as described in greater detail in the discussion related to FIG. 6. If the NE is a SONET node, it will run in a SONET virtual-leader operational state, as described in greater detail in the discussion related to FIG. 8. Although it is assumed in this illustrative description that an ATM NE initiates the request and SONET NE responds, the reverse, a SONET NE initiating and an ATM NE responding could also occur, with the corresponding descriptive roles reversed. In brief, if a leader NE receives an AIRP_Hello message in this state, the leader returns an AIRP_Leader_Ack message. The leader will periodically send a AIRP_Keep_Alive message to all the other connected NEs, awaits the reception of corresponding AIRP_Keep_Alive_Ack messages from the NEs. If the leader does not receive an AIRP_Keep_Alive_Ack message from a particular NE, the leader NE assumes that a failure of some sort has occurred with the NE, notifies the network management system of the failure and, and tears down the TCP connection with the failed NE. The leader NE will return to step 300, the starting state, if it receives an AIRP_Close message or if it receives no AIRP_Keep_Alive_Ack messages. Any other operational message will keep the leader in the leader operational state at step 318.

Figure 4:
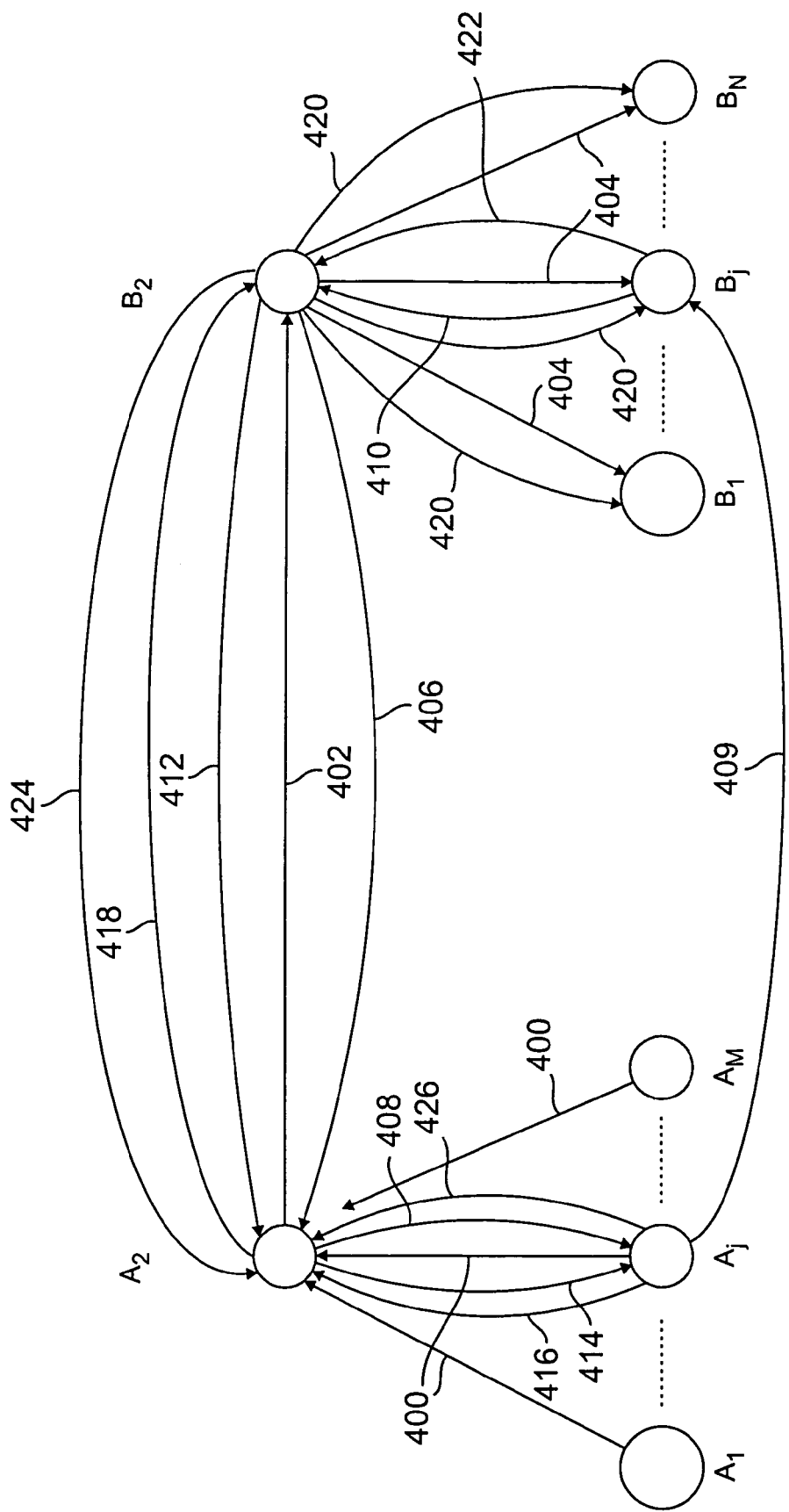
FIG. 4 is a sequence diagram which illustrates a process of automatic discovery of port binding information, such as might be employed with the system of FIG. 1.

The conceptual block diagram of FIG. 4 illustrates a message exchange scenario among. NEs in accordance with the principles of the present invention. In this illustrative example, an ATM NE leader AL acts as a go-between for its associated NEs A1, Ai, AM and a SONEET NE leader BL provides the same service for its associated NEs B1, Bj, BN. In this example all the ATM Nes send an AIRP_Recognition_Request to ATM NE leader AL, as indicated by the arrows 400. The AIRP_recognition_request message includes the physical link ID information, such as the switch name, slot number, and port number of an ATM port.

Each ATM NE includes a link-recognition FIFO queue and link recognition requests are placed in that queue as they are generated. A link recognition request may be passed on to the NE leader AL once the request has reached the front of the queue. After receiving link recognition requests from its associated NEs the ATM leader AL places the requests in its request queue, which is, illustratively, a FIFO queue and processes the requests as they emerge from the queue. In the case of a FIFO, as in this illustrative example, AL serves the requests in the order in which they are received Other prioritization schemes are possible.

Assuming the request from Ai arrives at the NE leader AL first, and reaches the front of AL's request queue, AL passes Ai's request to the SONET leader BL in step 402. The request is passed through an out of band channel, such as the LAN 122 of FIG. 1. After the SONET leader BL receives the forwarded AIRP_Recognition_Request from the ATM leader AL, BL notifies all the connected SONET NEs by sending an AIRP_Recognition_Notification in step 404. Once the SONET NEs receive the notification, they start to poll their idle links' ink status. In step 406 the SONET leader BL returns an AIRP_Recognition_Response to the ATM leader AL. After receiving the AIRP_Recognition_Response the ATM leader AL sends an AIRP_Recognition_Grant message to NE Ai in step 408. In response, the NE Ai begins to insert a recognition signal into the link of interest 409. In accordance with the principles of the present invention a transition of SONET Channel Status (K2's bits 6, 7, 8) from 000 (Idle) to 100 (testing signal) identifies the connected port. The recognition employs. SONET protection switching signals as described in greater detail in the discussion related to FIG. 2. Upon detecting the recognition signal a SONET NE, NE Bj in this example, reports the reception of the detection signal by sending an AIRP_Recognition_Detected message to the SONET leader BL in step 410.

After receiving the AIRP_Recognition_Detected message, the SONET leader NE BL returns NE Bj's port information to the ATM leader AL through an AIRP_Recognition_Detected message in step 412 and the ATM leader AL forwards this information to the NE Ai through an AIRP_Recognition_Detected message in step 414. When NE receives the AIRP_Recognition_Detected message, it stops inserting the recognition signal through its SONET link 409 and in step 416 returns an AIRP_Recognition_Ack to the ATM leader AL. In step 418 the ATM NE leader AL forwards the AIRP_Recognition_Ack message from Ai to the SONET NE leader BL. The SONET leader then sends an AIRP_Recognition_Ack message to all the connected SONET Nes in step 420. After receiving the AIRP_Recognition_Ack message, all the connected SONET NEs stop polling their idle links and SONET NE Bj checks the link corresponding to the detection signal to determine whether the link status returns to normal (idle). If the link status returns to idle, NE Bj sends an AIRP_Recognition_Ack message to the SONET leader BL in step 422. If the link status does not return to idle, the NE Bj sends an AIRP_Recognition_Nak message to the SONET leader BL in step 422. Once received, the SONET leader BL forwards the AIRP_Recognition_Ack or AIRP_Recognition_Ack message to the ATM leader AL in step 424. In response to the reception of either message the ATM leader AL removes from its queue Ai's current recognition request, and forwards the AIRP_Recognition_Ack or AIRP_Recognition__Nak message to NE Ai in step 426. Ai also removes its current top of its link-recognition request queue. If its link-recognition queue is not empty, Ai will send another link recognition request to the leader AL and the process will proceed from there as previously described.

The format and content of protocol data units (PDU) employed in automatic port binding discovery, that is, the new automatic interconnection recognition protocol (AIRP) in accordance with the principles of the present invention are described immediately below.

Each AIRP PDU is an AIRP header followed by AIRP messages. The AIRP header is:

Version                  PDU length

Version:
Two octet unsigned integer containing the version number of the protocol. This version of the specification specifies AIRP protocol version 1.

PDU Length:
Two octet integer specifying the total length of this PDU in octets, excluding the Version and PDU Length fields.
AIRP uses a Type-Length-Value (TLV) encoding scheme to encode much of the information carried in AIRP messages.
An AIRP TLV is encoded as 1 octet Type Field, followed by a 2 octet Length Field, followed by a variable length Value field.

Type                Length                Value

Type
Encodes how the Value field is to be interpreted.
Length
Specifies the length of the Value field in octets.
Value
Octet string of Length octets that encodes information to be interpreted as specified by the Type field.
In total, there are fourteen AIRP message types defined:
AIRP_Hello TLV:

Type = 1                      Length = $\sum_i$ length(value_field)

Value field definition:
ATM/SONET group address
Sender's MAC Address
Sender's IP Address
AIRP_Hello_Ack TLV:

Type = 2                      Length = $\sum_i$ length(value_field)

Value field definition:
ATM/SONET group address
Receiver's MAC address
Sender's MAC address
Sender's IP address
AIRP_Leader_Ack TLV:

Type = 3                      Length = $\sum_i$ length(value_field)

Value field definition:
ATM/SONET group address
Receiver's MAC address
Sender's MAC address
Sender's IP address
AIRP_Close TLV:

Type = 4                      Length = $\sum_i$ length(value_field)

Value field definition:
ATM/SONET group address
AIRP_Keep_Alive TLV:

Type = 5                      Length = $\sum_i$ length(value_field)

Value field definition:
ATM/SONET group address
ATM/SONET Leader's MAC address
AIRP_Keep_Alive_Ack TLV:

Type = 6                      Length = $\sum_i$ length(value_field)

Value field definition:
ATM/SONET group address
ATM/SONET Leader's MAC address
Sender's MAC address
AIRP_Reset TLV:

-continued

| Type = 7 | Length = $\sum_i$ length(value_field) |
|---|---|

Value field definition:
ATM/SONET group address
ATM/SONET Leader's MAC address
Sender's MAC address
AIRP_Recognition_Request TLV:

| Type = 8 | Length = $\sum_i$ length(value_field) |
|---|---|

Value field definition:
ATM/SONET group address
Destination's MAC address
Sender's MAC address
Message sequence No.
Port ID
AIRP_Recognition_Notification TLV:

| Type = 9 | Length = $\sum_i$ length(value_field) |
|---|---|

Value field definition:
ATM/SONET group address
AIRP_Recognition_Grant TLV:

| Type = 10 | Length = $\sum_i$ length(value_field) |
|---|---|

Value field definition:
ATM/SONET group address
Destination's MAC address
Recognition_request message sequence No.
AIRP_Recognition_Detected TLV:

| Type = 11 | Length = $\sum_i$ length(value_field) |
|---|---|

Value field definition:
ATM/SONET group address
Destination's MAC address
Sender's MAC address
Recognition_request detected sequence No.
Detected Port Information
AIRP_Recognition_Response TLV:

| Type = 12 | Length = $\sum_i$ length(value_field) |
|---|---|

Value field definition:
ATM/SONET group address
Destination's MAC address
Sender's MAC address
Recognition_request detected sequence No.
AIRP_Ack TLV:

| Type = 13 | Length = $\sum_i$ length(value_field) |
|---|---|

Value field definition:
ATM/SONET group address
AIRP_Nak TLV:

| Type = 14 | Length = $\sum_i$ length(value_field) |
|---|---|

Value field definition:
ATM/SONET group address

The AIRP operation of an active NE, that is an NE that requests port identification, will be discussed in relation to the state diagram of FIG. 5. An N E which requests port identification will be referred to as an active NE and an NE which receives a port identification message will be referred to as a passive NE In this example, the active NE is a non-leader ATM NE. The AIRP finite state machine (FSM) is (re-) started when a node is started or re-set. The process begins in state 1 500, the idle state, in which it is assumed that system configuration has been completed. For example, the ATM NE NE-A1, would be configured to indicate which links are connected with which neighboring NEs. Note that, although the NE may be configured at this point to know which neighboring NE is connected through which link, the port interconnectivity is not known at this point. Link initialization could happen at system starting/re-set time and run time, and will trigger an AIRP state transition To ensure that only one recognition signal will be sent to a receiving side at one time, all the incoming link initialization requests may be placed in a first in first out (FIFO) queue, with only a request at the top of the queue being capable of triggering a state transition. It is also assumed that the default channel status (bits 6, 7, 8 of K2 byte) of the initialized link is 000 (Idle). If the NE has been reset, sends an AIRP_Reset message to its virtual leader NE. After processing any link initialization overhead, the ATM NE proceeds to state 2 502, the request state.

In state 2 502, the ATM NE sends an AIRP_recognition_request message to its leader NE. Included within the AIRP_recognition_request message is the ATM link number of the link of the request currently at the top of the queue. After sending the AIRP_recognition_request message the ATM NE awaits a grant message from the leader NE. If another recognition request arrives while the NE is in state 2, the request will be placed at the end of the requesting queue. If the NE receives a message from the passive NE leader before the NE receives the grant message from its leader, the active NE leader, the active NE discards the passive leader's message. Once the active NE receives an AIRP_recognition_grant message from the active leader NE, the active NE will transition into the "insert state", state 3 504.

In state 3, the insert state 504, the active NE triggers its SONET interface driver to insert the test, or recognition, signal, as described above, into the link corresponding to the ports which are being discovered. Additionally, the active NE awaits the reception of an AIRP_recognition_detected message from the active leader NE and initiates a waiting-timer. In this state, if another link recognition request arrives, it is placed at the end of link recognition requesting queue. Any messages from the passive leader NE will be discarded. Once the active NE receives an AIRP_recognition_detected message from the active leader NE, the active NE transitions into state 4 506 and the waiting-timer is stopped. However, if the waiting-timer expires before the NE receives an AIRP_recognition_detected message from the active leader NE, the ATM NE transitions into State 5 508.

Once in the detected state 4 506 the active NE records detected information, such as the port binding information. This information may be placed in a database, or table, such as a port binding table. After recording this binding information, the active NE triggers its SONET interface driver to insert idle signal (000) into the link in question. Additionally, the active NE sends an AIRP_recognition_acknowledgement message to the active leader NE and initiates a waiting-timer. The ATM NE then transitions into state 6 510, the awaiting state. Any other link recognition request that arrives during state 4 is placed at the end of the requesting queue. Messages received from the passive leader NE will be discarded.

Returning, for a moment, to the notify state 5 508, the active NE indicates to the active leader NE that an anomaly has occurred and removes the link-request from the link recognition request queue and returns to state 1 500. If another link recognition request arrives during state 4, it is placed at the end of the requesting queue. Messages received from the passive leader NE will be discarded.

In the await state 6 510, the active NE stops the waiting timer and transitions to state 5 508 if it receives an AIRP_reccognition_Nak message from the active leader NE. Otherwise, the active NE should receive an AIRP_reccognition_ack message from the active leader NE, in which case the NE de-queues the link recognition request and transitions to state 1 500. If another link recognition request arrives while the ATM NE resides in state 6, the active NE places the request at the end of the requesting queue. Messages received from the passive leader NE will be discarded.

The AIRP operation of an active leader NE, that is an NE that serves requests for port identification, will be discussed in relation to the state diagram of FIG. 6. In this example, the active NE is a leader ATM NE. The AIRP finite state machine (FSM) is (re-) started when a node is started or re-set. The process begins in state 1 600, the idle state, in which it is assumed that system configuration has been completed, including the establishment of TCP connections with other NEs. Link initialization could happen at system starting/re-set time and run time, and will trigger an AIRP state transition. The active leader NE clears both its NE request queue and its own link recognition request queue and initializes a state variable my_request_status to 0. To ensure that only one recognition signal will be sent to a receiving side at one time, all the incoming link initialization requests may be placed in a first in first out (FIFO) queue, with only a request at the top of the queue being capable of triggering a state transition. It is also assumed that the default channel status (bits 6, 7, 8 of K2 byte) of the initialized link is 000 (Idle). The leader NE checks its state variable: my_request_status. If the status is 0, the top of its link recognition queue is placed at the end of the active ATM NE request queue and sets the status to 1. If the current value of my_request_status is 1, the link recognition request is placed at the end of the link recognition queue. Incoming requests from the other ATM/active NEs is placed at the end of the recognition request queue. A reset message from a particular NE will cause the leader to remove all the NEs outstanding requests from the queue. As soon as the ATM NE request queue is non-empty, the process proceeds to state 2 602.

In state 2 602, the ATM NE retreives an AIRP_recognition_request message from the top of its request queue and determines whether the sender is still "alive". If not the message is placed at the end of the ATM NE request queue and succeeding messages are tested until a message associated with and "alive" requester is found. Upon finding such a message the ATM NE sends the AIRP_recognition_request message to the passive NE leader, a SONET NE leader in this example. After sending the AIRP_recognition_request message the ATM leader NE awaits a response message from the SONET leader NE. The ATM leader sends the message to the pre-configured SONET multi-cast address. It is assumed that here is not a TCP connection between the leaders and that message-resend for several times, if no response is received within a timer preiod, is implicitly supported If another recognition request arrives while the NE is in state 2, the request will be placed at the end of the requesting queue and, if the leader NE generates a recognition request of its own, it places the request at the end of its own ATM NE request queue. An AIRP_reset message from a particular ATM NE will cause the ATM leader to remove all of the NEs outstanding requests from the request queue. Reception of an AIRP_Recognition_Response message from SONET leader will transition into state 3 604, the response state.

In state 3, the response state 604, the ATM NE will check whether the current request is from itself. If it is, the NE will trigger its SONET interface driver to insert the recognition signal, as described above, into the link of interest If request is from other NE, the leader NE sends an AIRP_Recognition_Grant message to the requesting NE. Additionally, the leader NE awaits an AIRP_Recognition_Detected message from the SONET (passive) leader and starts waiting-timer. If any other link recognition request of its own arrives, the request will be put to the end of its link-recognition queue if any requests from other ATM NE arrives, the request will be placed at the end of the leader-NE request queue. Any reset message from a particular ATM NE will cause the ATM leader to remove all of the NE's outstanding requests from the leader ATM-NE request queue. The reception of an AIRP_Recognition_Detected message from the SONET leader will transition the process into State 4, the detected state 606, and waiting-timer is stopped. If the waiting-timer expires or the NE receives an AIRP_Nak message from the SONET leader, the leader will transition into State 5, the notify state 608 instead.

In State 4, the detected state 606, the active ATM. NE leader will record detected information, then check to see if the request is from itself and, if so, the leader NE will trigger its SONET interface driver to insert idle signal (000) into corresponding link. Then the NE sends an AIRP_Ack message to itself. Otherwise, the leader NE sends an AIRP_Recognition_Detected message to the corresponding ATM NE. The reception of an AIRP_Ack message either from another ATM NE or from itself will transition the leader into State 6, the acknowledgement state 610. Any reset message from a particular ATM NE will cause the leader to remove all of the NE's outstanding requests from its ATM-NE request queue.

In State 5, notify state 608, if the request is from another NE, the ATM NE leader will send either AIRP_Nak to notify the corresponding ATM NE that there is an error with the link currently being processed. The leader de-queues the corresponding request. If the request is from itself, the leader checks its link-recognition queue to see whether it is empty. If the queue is not empty, the leader NE will move the top request of its link-recognition queue to the end of the ATM-NE request queue. Otherwise, it will set my_request_status back to 0 again. The leader then transitions to state 1, the idle state, 600. If another link recognition request of its own arrives, the request will be placed at the end of the leader's link-recognition queue. If a request from another ATM NE arrives, the request will be placed at the end of the ATM-NE request queue. Any reset message from a particular ATM NE will cause the ATM leader to remove all of the NE's outstanding requests from the ATM-NE request queue.

In State 6, the Ack state 610, if nothing is received before the timeout, or if the leader receives an AIRP_Nak message from the passive side during the timer period, the NE leader stops the timer and transitions to State 5, the notify state 608. Otherwise, the leader NE should receive an AIRP_Ack message and, if the request is from another ATM NE, the leader sends an AIRP_Ack message to corresponding ATM NE and transitions to State 1 600. During this state, if another link recognition request of its own arrives, the request will be put to the end of its link-recognition queue. If another request from another ATM NE arrives, the request will be put at the end of the ATM-NE request queue. A reset message from a particular ATM NE will cause the ATM leader to remove all of the NE's outstanding requests from its ATM-NE request queue. During this state, the ATM NE will de-queue the link-request. If the request is from itself, it will check its link-recognition queue to see whether it is empty. If it is not, the leader NE will move the top of its link-recognition queue to the end of the ATM-NE request queue. Otherwise, the leader NE will set my_request_status back to 0 again and return to state 1, the idle state 600.

The operation of a non-leader passive NE is depicted in the state diagram of FIG. 7 which begins in the idle state 700 in which it is assumed that system configuration has been completed. Link initialization could happen at system starting/re-set time and run time, and will trigger an AIRP state transition. It is also assumed that the default channel status (bits 6, 7, 8 of K2 byte, of initialized link is 000 (Idle). In this state, the passive non-leader NE will discard any message sent by an ATM (active) leader. After receiving the AIRP_Recognition_Notification message from the SONET (passive) leader, the NE transitions to the polling state, state 2 702.

In State 2 702, the SONET NE starts polling its line interfaces with current link status as idle (bit 6, 7, 8 of byte K2 is 000), and starts a detection-timer. The NE will discard any message sent by the ATM leader. If the NE identifies a recognition signal associated with a particular line interface, the NE stops the timer, and transitions into State 3 704, the detected state. If the NE receives an AIRP_Ack message from the SONET leader during the timer period, the NE stops polling and returns to State 1, the idle state 700. If the detection timer times out, the NE proceeds to the notify state, state 4 706.

In State 3, the detected state 704, the SONET NE sends an AIRP_Recognition_Detected message to the SONET leader, then awaits the return of an AIRP_Ack message from the SONET leader. In this state the NE will discard any message sent by an ATM leader. The reception of the AIRP_Ack Message sends the NE into state 5, the check state 708.

In State 4, the notify state 706, the SONET NE notifies the SONET leader that there is an error involving the ink of interest, then returns to State 1, 700. During this state, the NE discards any message sent by the ATM leader. In State 5, the check state 708, the SONET NE checks the current link status of the just identified link. If the status returns to idle: 000, the NE sends an AIRP_Ack message to the SONET leader and returns to the idle state, state 1 700. Otherwise, the NE sends an AIRP_Nak message to the SONET leader and proceeds to state 4, the notify state 706. In this state, the NE will discard any message sent by the ATM leader.

Figure 8:
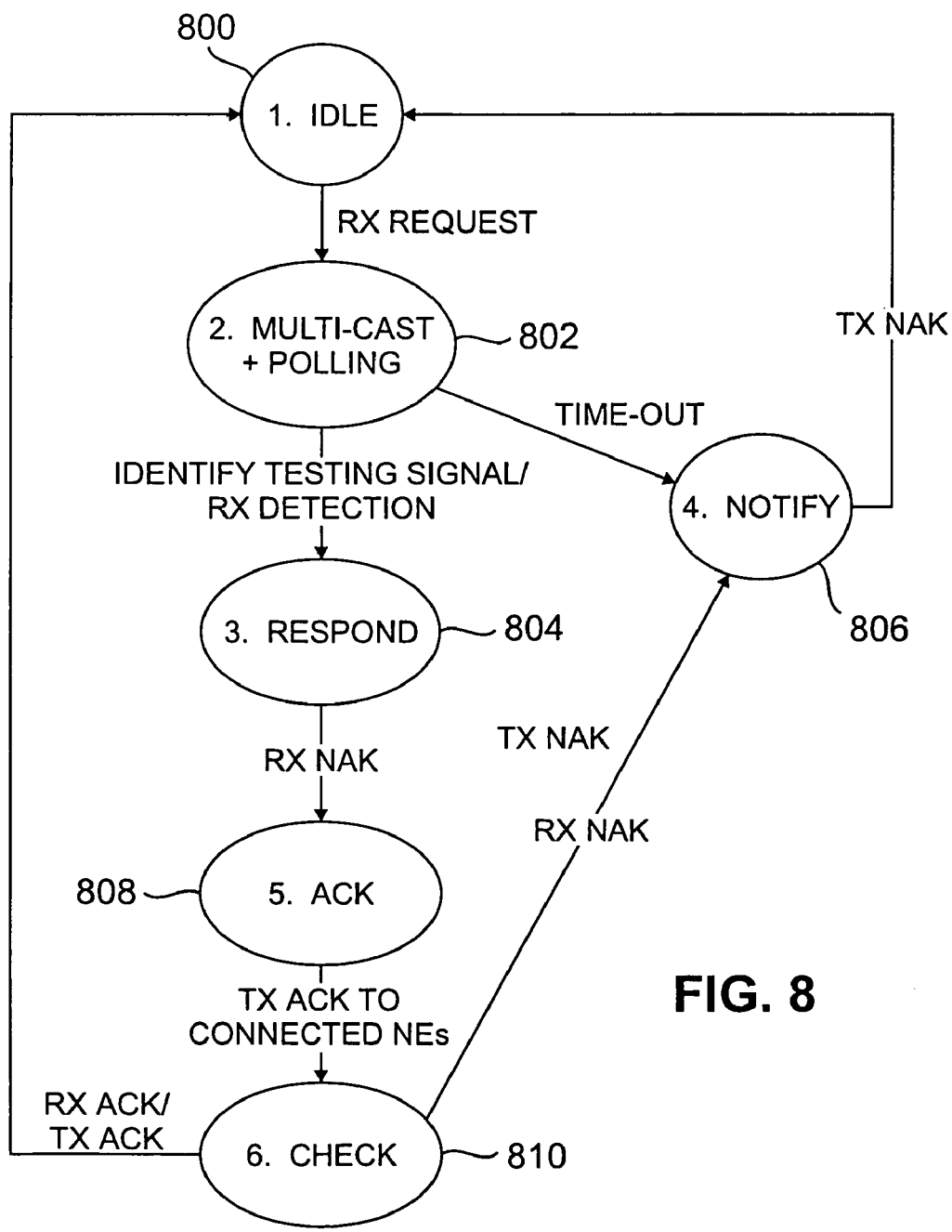
FIG. 8 is a state diagram that illustrates the operation of a non-requesting leader NE in accordance with the principles of the present invention.

The operation of a passive leader NE is depicted in the state diagram of FIG. 8 which begins in the idle state 800 in which it is assumed that system configuration has been completed. Link initialization could happen at system starting/re-set time and run time, and will trigger an AIRP state transition. It is also assumed that the default channel status (bits 6, 7, 8 of K2 byte) of initialized link is 000 (idle). After receiving an AIRP_Recognition_Request message from the ATM, leader, the NE transitions to the multicast and polling state, state 2 802.

In State 2, the multicast and polling state 802, the SONET NE sends an AIRP_Recognition_Notification message to all the connected SONET NEs and starts polling its line interfaces with current link status as idle (bit 6, 7, 8 of byte K2 is 000). It also starts a detection-timer and returns an AIRP_Recognition_Response to the ATM leader. If the NE identifies a recognition signal associated with particular line interface, it stops the timer. If the NE receives an AIRP_Recognition_Detected message from a particular SONET NE, it proceeds to state 3, the respond state 804.

State 3, the detected state 804, the SONET leader NE sends an AIRP_Recognition_Detected message to the ATM leader, then awaits an AIRP_Ack message from the ATM leader. When the AIRP_Ack message is received, the NE will proceed to state 5, the Ack state 808.

In State 4, the notify state 806, the SONET NE notifies the ATM leader by sending an AIRP_Nak message, then the SONET NE returns to State 1, Idle 800. In state 4, the NE stores any messages sent by the ATM leader.

In State 5, the Ack every connected NE state 808, the SONET leader NE sends an AIRP_Ack message to all the connected SONET NEs. The NE stops its own polling. If the NE detected the recognition signal, it checks the corresponding link to see whether the link status comes back to idle. If the link status returns to idle, the NE sends an AIRP_Ack to itself, otherwise it sends an AIRP_Nak to itself. The arrival of either an AIRP_Ack or AIRP_Nak will trigger a transition to state 6, the check state 810. In State 6, the check state 810, the SONET NE checks the received message. If the message is an AIRP_Ack, the NE sends an AIRP_Ack message to the ATM leader and returns to state 1, the idle state 800. Otherwise, the NE transitions to the notify state 806, state 4.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A system comprising:
    a first type of network element (NE) comprising:
    a port for connection to another network element, the port configured to support at least one transport level overhead message wherein the first type of NE is configured to:
    transmit a request for port identification to one of a plurality of second type of NEs, receive a request for port identification from one of a plurality of the second type of NEs, and transmit a port detection signal in response to the received port identification wherein each of the requests and detection signal is transferred over an out of band channel.

2. The system of claim 1 wherein the first type of NE is further configured to transmit the request for port identification to a first type of leader NE.

3. The system of claim 1 further comprising a first type of leader NE configured to place a request for port identification in a queue.

4. The system of claim 3 wherein the first type of leader NE is further configured to accept port identification requests from other first type of non-leader NEs and place them in the queue.

5. The system of claim 1 wherein the first type of NE is a SONET NE.

6. The system of claim 1 wherein the first type of NE is an SDH NE.

7. The system of claim 1 wherein the first type of NE is a packet switching NE.

8. The system of claim 1 wherein the first type of NE is an ATM NE.

9. The system of claim 1 wherein the port detection signal is a SONET/SDH protection switching message.

10. The system of claim 1 wherein the first type of NE comprises a plurality of SONET/SDH ports and is further configured to poll a plurality of ports to detect which of the ports receives the port detection signal.

11. The system of claim 1 wherein the first type of NE is further configured to store port binding information in response to the port detection signal.

12. The system of claim 11 wherein the first type of NE is further configured to transmit the port binding information to an associated, first type of leader NE.

13. The system as in claim 1 further comprising:
a plurality of first and second type of NEs, each of the NEs including:
a port for connection to a first or second type of network element, the port configured to support at least one transport level overhead message wherein each NE is configured to:
transmit a request for port identification to one of a plurality of the first or second type of NE, receive a request for port identification from one of the plurality of the first or second type of NE, and transmit a port detection signal in response to the received port identification request wherein each of the requests and detection signal is transferred over an out of band channel.

14. The system as in claim 1 wherein the first and second type of NE is selected from the group consisting of a circuit switched NE and a packet switched NE.

15. A method comprising:
configuring a port of a first type of network element (NE) to support at least one transport level overhead message;
transmitting a request for port identification to one of a plurality of second type of NEs;
receiving a request for port identification from one of the plurality of the second type of NEs; and
transmitting a port detection signal in response to the received port identification request wherein each of the requests and detection signal is transferred over an out of band channel.

16. The method of claim 15 further comprising transmitting the request for port identification to a first type of leader NE.

17. The method of claim 15 further comprising placing a request for port identification in a queue.

18. The method of claim 17 further comprising accepting port identification requests from other first type of non-leader NEs and placing them in the queue.

19. The method of claim 15 wherein the first type of NE is a SONET NE.

20. The method of claim 15 wherein the first type of NE is an SDH NE.

21. The method of claim 15 wherein the first type of NE is a packet switching NE.

22. The method of claim 15 wherein the first type of NE is an ATM NE.

23. The method of claim 15 wherein the port detection signal is a SONET/SDH protection switching message.

24. The method of claim 15 wherein the first type of NE comprises a plurality of SONET/SDH ports, the method further comprising polling a plurality of ports to detect which of the ports receives the port detection signal.

25. The method of claim 15 further comprising storing port binding information in response to the port detection signal.

26. The method of claim 25 further comprising transmitting the port binding information to an associated, first type of leader NE.

* * * * *